United States Patent [19]

Gaston

[11] Patent Number: 5,333,499
[45] Date of Patent: Aug. 2, 1994

[54] LIQUID MEASURING FLOAT AND FLOAT ROD ASSEMBLY

[75] Inventor: Robert D. Gaston, Dearborn Heights, Mich.

[73] Assignee: Ford Motor Company, Dearborn, Mich.

[21] Appl. No.: 825,453

[22] Filed: Jan. 22, 1992

Related U.S. Application Data

[63] Continuation of Ser. No. 405,720, Sep. 11, 1989, abandoned.

[51] Int. Cl.$^5$ ............................................. G01F 23/32
[52] U.S. Cl. ..................................... 73/317; 73/322.5
[58] Field of Search .............. 73/305, 306, 317, 322.5

[56] References Cited

U.S. PATENT DOCUMENTS

| 1,252,638 | 1/1918 | Gelatt | 73/317 |
|---|---|---|---|
| 1,648,731 | 11/1927 | Hower et al. | 73/317 |
| 1,654,307 | 12/1927 | Paty | 73/317 |
| 2,266,298 | 12/1941 | Bacon | 73/317 |
| 2,325,582 | 8/1943 | Andersen | 73/317 |
| 2,508,290 | 5/1950 | Poetsch | 73/322.5 |
| 2,792,164 | 5/1957 | Cauffiel | 73/322.5 |
| 3,200,646 | 8/1965 | Donko et al. | 73/317 |
| 3,316,763 | 5/1967 | De Giers | 73/317 |
| 3,361,156 | 1/1968 | Klingle, Sr. | 73/322.5 |
| 3,463,843 | 8/1969 | Taylor et al. | 73/322.5 |
| 3,915,001 | 10/1975 | Skrabs | 73/322.5 |
| 4,051,591 | 10/1977 | Thompson | 73/322.5 |
| 4,167,951 | 9/1979 | Hume | 73/322.5 |
| 4,441,364 | 4/1984 | Montie | 73/313 |
| 4,627,378 | 12/1986 | Manness et al. | 73/322.5 |
| 4,862,745 | 9/1989 | Rericha et al. | 73/322.5 |
| 4,870,861 | 10/1989 | Ohtani et al. | 73/317 |

FOREIGN PATENT DOCUMENTS

| 1336224 | 7/1963 | France | 340/625 |
|---|---|---|---|
| 0071322 | 4/1986 | Japan | 73/322.5 |

OTHER PUBLICATIONS

Nippondenso Sample Part Photographs.

Primary Examiner—William A. Cuchlinski, Jr.
Assistant Examiner—Alvin Wirthlin
Attorney, Agent, or Firm—Mark Mollon; Roger L. May

[57] ABSTRACT

A float rod and float body are fastened together by means of a two-point attachment in which a substantially straight remote end of the float rod is inserted into a rod receiving passage simultaneously with a grasping point on the float rod being received by a snap-in retainer on a portion of the float rod separated from the remote end by a bend in the float rod. Fastening of the parts is thus achieved in a single linear motion for ease of assembly. The snap-in retainer preferably is comprised of a fork whereby the float body is retained on the float rod against forces in any direction after being assembled. The float body can be filled with an appropriate filling material to provide the desired buoyancy in the liquid to be measured. An embodiment particularly adapted to fuel level measurement in vehicle fuel tanks is described.

7 Claims, 2 Drawing Sheets

LIQUID MEASURING FLOAT AND FLOAT ROD ASSEMBLY

This application is a continuation of application Ser. No. 07/405,720, filed Sep. 11, 1989, now abandoned.

BACKGROUND OF THE INVENTION

The present invention relates in general to a flotation device for measuring the level of a liquid, and more specifically to means for interconnecting a float and a float rod.

Fuel level sensing in automobile fuel tanks is typically accomplished using a pivotable float which controls movement of a wiper contact over a resistor. Electrical connections to the wiper contact and to the resistor result in a variable measure of resistance as the float moves in accordance with the level of fuel in the tank. A signal resulting from the variable resistance is sent to an indicator, such as an electronic gauge, to indicate to a vehicle operator the amount of fuel present in the tank.

The variable resistor mechanism and the float body are typically interconnected by a steel float rod arm extending therebetween. Various techniques are known for connecting the float to the float rod.

For example, U.S. Pat. No. 2,325,582 issued to Anderson and U.S. Pat. No. 3,316,763 issued to De Giers, show a float rod arm terminating in a U-shaped bracket which carries a shaft. A float member is rotatably retained on the shaft. By means of the rotation of the float body, the body maintains a horizontal orientation at the surface of the liquid being measured. This type of float and float arm assembly is undesirable due to the expense and complexity required to manufacture and assemble the large number of parts involved.

U.S. Pat. No. 3,361,156 issued to Klingle, discloses a float body secured to a valve arm by means of barbs projecting from the valve arm and penetrating the float body. In large volume production, the low weight and cost of a thin steel float rod are preferred to the large bracket which is required in Klingle. Furthermore, barbs cannot easily penetrate into plastic float bodies which are typically used in fuel tanks for their imperviousness to combustion fuels.

Donko et al., U.S. Pat. No. 3,200,646, discloses what is known as a shepherd's hook attachment between a float body and a float rod. A cylindrical float body includes a groove for receiving the arcuately bent end portion of a float rod. The shepherd's hook design is lacking in durability and does not provide retention of the float body equally strongly against forces applied to the float body in all directions. It is also possible that the float body could be assembled in the shepherd's hook oriented in the wrong direction.

These are some of the disadvantages that the present invention overcomes.

SUMMARY OF THE INVENTION

It is a principal object of the present invention to provide a float mechanism which is simple and is inexpensive to fabricate and assemble.

It is a further object of the invention to provide a float to float rod assembly which is highly durable and is capable of withstanding repeated high force impacts between the float and a tank during fuel sloshing without damage to either the float mechanism or the tank.

It is another object of the present invention to improve the accuracy of liquid level measurement using a float mechanism.

These and other objects are achieved using a float mechanism comprising a float rod and a float body. The float rod extends from a pivot axis toward a substantially straight remote end and includes at least one bend between the pivot axis and the remote end so that the remote end is substantially parallel to but not colinear with the pivot axis and so that an intermediate portion of the float rod is not parallel to the pivot axis. The float body includes a rod receiving passage oriented parallel to the pivot axis and having the remote end inserted therein. The float body also includes a snap-in retainer grasping the intermediate portion therein. The snap-in retainer may preferably be comprised of a fork extending in a direction parallel to the pivot axis.

BRIEF DESCRIPTION OF THE DRAWINGS

The novel features of the invention are set forth with particularity in the appended claims. The invention itself, however, both as to its organization and method of operation, together with further objects and advantages thereof, may best be understood by reference to the following description taken in conjunction with the accompanying drawings, in which:

FIG. 6 is a top view of an alternative embodiment of the float body of the present invention.

FIG. 7 is a side view showing the interconnection of a float rod with the float body of FIG. 6.

DETAILED DESCRIPTION OF PREFERRED EMBODIMENTS

Figure 1:
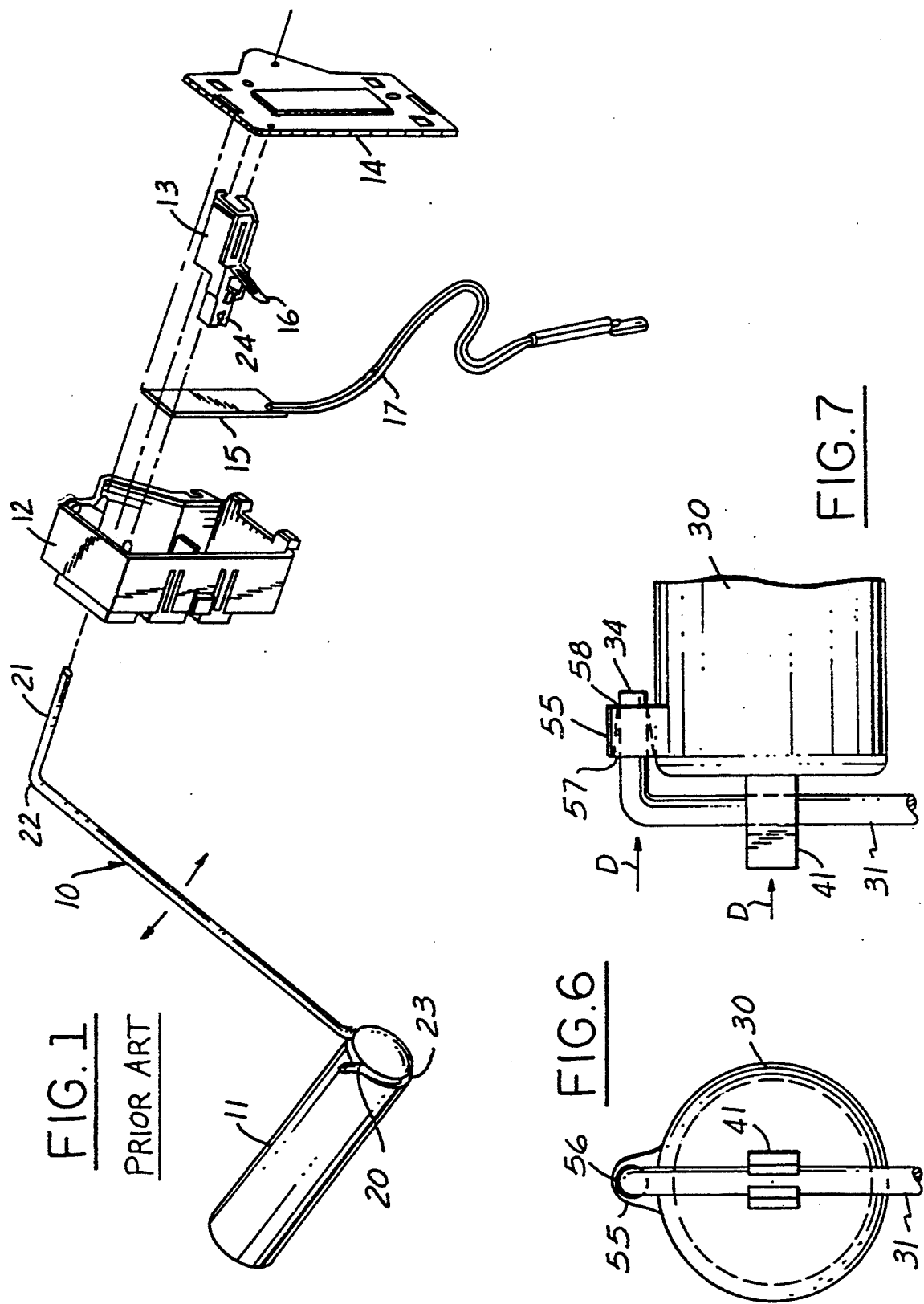
FIG. 1 is an exploded perspective view of a fuel sender assembly having an attachment between a float rod and a float body according to the prior art.

FIG. 1 shows a fuel sender assembly including a float rod 10 and a float body 11 joined by one prior art method. Float rod 10 includes a shepherd's hook shaped bend 20 at one remote end and has a pivotal axis portion 21 at the opposite end by virtue of a bend 22. Float body 11 is retained in shepherd's hook bend 20 at a groove 23.

Pivot axis end 21 of float rod 10 is retained by a variable resistor mechanism. The mechanism shown corresponds to the teachings of previously filed and commonly-owned U.S. applications Ser. No. 289,883, filed Dec. 27, 1988, now U.S. Pat. No. 4,873,865 issued Oct. 17, 1989, and U.S. Ser. No. 359,061, filed May 30, 1989, both applications being incorporated by reference herein in their entirety. The variable resistance mechanism includes a case 12, a resistor card 15 received in case 12, a carrier element 13 having a contact spring 16 attached thereto for sliding contact with resistor card 15, and a base member 14 for snapping together with case 12. Contact spring 16 also contacts base member 14 which is metallic and provides one electrical connection to the variable resistor. A wire 17 is connected to resistor card 15 and provides the second electrical connection to the variable resistor.

Pivot axis end 21 of float rod 10 passes through a hole in case 12 (not shown), then through a bore in carrier element 13, and then through a hole in base member 14. A fork 24 extends through a slot (not shown) in case 12 to grasp float rod 10 between bend 22 and shepherd's hook 20. Thus, float body 11 revolves about the axis defined by pivot axis 21 as fuel level changes in a fuel tank. This movement is transmitted to contact spring 16 which varies the resistance between wire 17 and base member 14. Base member 14 is mounted to a grounded metallic surface of a fuel tank and wire 17 is connected to a gauge drive circuit to indicate fuel level within a fuel tank.

Figure 2:
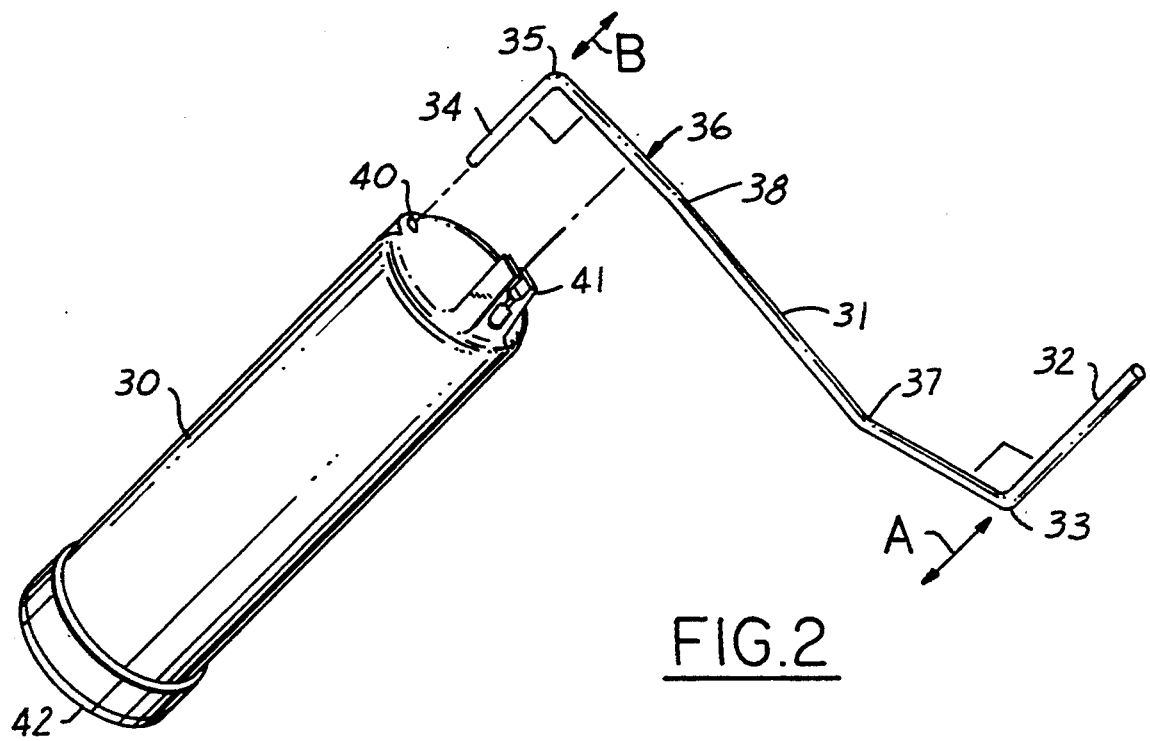
FIG. 2 is a perspective view of one embodiment of a float body and float rod of the present invention.

Turning now to FIG. 2, an improved float rod and float body arrangement is shown. Float body 30 is adapted to be secured to a float rod 31. Float rod 31 includes a pivot axis end 32 defining an axis A and includes a remote end 34 which is preferably substantially straight and which defines an axis B which is preferably substantially parallel to axis A. A bend 33 separates pivot axis end 32 from the remaining portion of float rod 31. A bend 35 separates remote end 34 from the remaining portion of float rod 31. A pair of intermediate bends 37 and 38 are provided in order to position float body 30 close to the plane of the variable resistance sending unit thus providing a compact design.

Float body 30 includes a passage or tunnel 40 for receiving remote end 34. A snap-in fork 41 is offset from passage 40 and is adapted to grasp float rod 31 at a grasping point 36 such that bend 35 is intermediate to the two fastening points, i.e., the point where remote end 34 is received in passage 40 and the point where grasping point 36 is received in fork 41. Float body 30 may further include an end cap 42.

The invention shown in FIG. 2 provides for a two point fastening of the float body 30 to float rod 31 which is achieved with insertion of the parts in one single motion. Therefore, assembly of the parts is greatly simplified. Furthermore, the parts are tightly secured against forces applied in any direction after assembly. Conveniently, the insertion motion is along the longitudinal dimension of float body 30. The parts can be assembled in only one way. Therefore, assembly errors are reduced.

Figure 3:
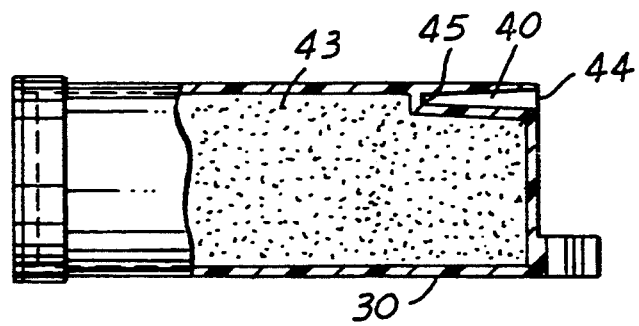
FIG. 3 is a partial side cross-sectional view of a float body according to the present invention.

FIG. 3 shows that passage 40 extends from an entrance 44 to a termination 45. The diameter of passage 40 is tapered from a diameter at entrance 44 which is slightly greater than the diameter of remote end 34 to a diameter at termination 45 which is substantially equal to the diameter of remote end 34. FIG. 3 further shows that float body 30 can preferably be comprised of a hollow body filled with a filling material 43. The function of filling material 43 is to provide a desired buoyancy for the float in the liquid to be measured. For example, a float body 30 adapted for flotation in an alcohol-based fuel could include a filling material 43 comprised of fine glass beads retained within float body 30 by end cap 42. Other shapes and materials could be used for filling material 43 such as solid shapes rather than beads and plastics rather than glass. In addition, it is preferable to tailor the thickness of the float body walls to contain the filling material in a position resulting in center point flotation, i.e., one-half of the float body is above and one-half of the float body is below the surface of the liquid fuel.

Figure 4:
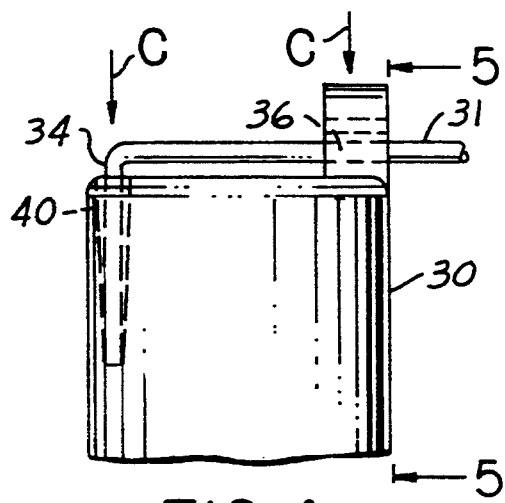
FIG. 4 is a side view showing the attachment of the float body and float rod of the present invention.
Figure 5:
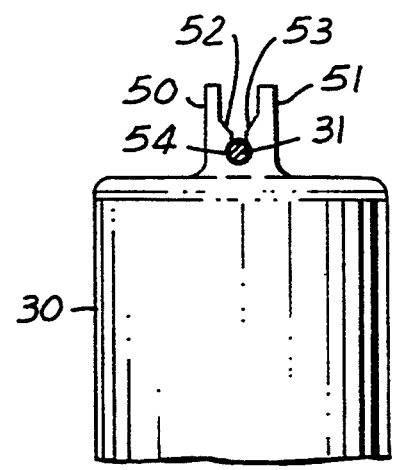
FIG. 5 is a front view shown along lines 5—5 of FIG. 4.

FIGS. 4 and 5 show float rod 31 joined with float body 30. By moving float rod 31 in the direction of arrows C relative to float body 30, remote end 34 is received in passage 40 and grasping point 36 is received in fork 41. Fork 41 includes a fork half 50 and a fork half 51, each including a respective nib 52 and 53. A recess 54 is formed below nibs 52 and 53 which receives float rod 31.

FIGS. 6 and 7 illustrate an alternative embodiment of the invention in which fork 41 is located at the central longitudinal axis of float body 30 and wherein a tab 55 is provided projecting from the side of float body 30. A passage 56 is provided in tab 55 for receiving remote end 34 of float rod 31. Passage 56 includes an entrance 57 and has a diameter which narrows to an exit 58. Joining of the parts is achieved by relative linear motion along arrows D in FIG. 7.

The shapes and the two-point attachment of the float mechanism of the present invention provides a very durable float assembly for use as a fuel sender in a vehicle fuel tank. Furthermore, the ability to assemble the parts in a single linear motion provides convenient and inexpensive manufacture of the fuel sender. The symmetrical circular shape of the float body provides equal clearance between the float body and fuel tank walls at full and empty indicating positions, resulting in high measuring accuracy.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

What is claimed is:

1. A floating mechanism comprising:
   a float body having a rod receiving tunnel therein oriented along an axis and having a snap-in retainer comprised of a pair of projections extending from said float body parallel and noncolinear with said axis, said projections forming a recess oriented perpendicular to said axis; and
   a float rod having a substantially straight first end slidably received in said rod receiving tunnel and an intermediate portion substantially perpendicular to said first end and snapped into said recess simultaneously in a single linear motion with said first end being slidably received in said rod receiving tunnel.

2. The mechanism of claim 1 further comprising pivot means for pivotably securing the other end of said float rod.

3. A fuel sender mechanism comprising:
   variable resistor means for creating a variable voltage and including a rotatable wiper contact, said variable voltage corresponding to the angular position of said wiper contact;
   a float body having a rod receiving tunnel therein oriented along an axis and having a snap-in retainer comprised of a pair of projections extending from said float body parallel and noncolinear with said axis, said projections forming a recess oriented perpendicular to said axis; and
   a float rod coupled to said variable resistor means and having a substantially straight first end slidably received in said rod receiving tunnel and an intermediate portion substantially perpendicular to said first end and snapped into said recess simultaneously in a single linear motion with said first end being slidably received in said rod receiving tunnel.

4. The mechanism of claim 3 wherein said float body is elongated in the direction of said axis.

5. The mechanism of claim 4 wherein said float body comprises a projecting tab, said tunnel being formed in said tab.

6. The mechanism of claim 3 wherein said rod receiving tunnel extends from an entrance to a termination, the diametral width of said rod receiving tunnel generally narrowing from said entrance to said termination.

7. The mechanism of claim 3 wherein said float rod includes a bend substantially equal to 90° located between said first end and said intermediate portion.

* * * * *